United States Patent [19]

Le Salver et al.

[11] 4,262,886

[45] Apr. 21, 1981

[54] ELASTICALLY YIELDABLE BLOCK STRUCTURE, IN PARTICULAR FOR THE SUSPENSION OF AN ENGINE OF A VEHICLE

[75] Inventors: Robert Le Salver, Chanteloup les Vignes; Dominique Poupard, Chaville, both of France

[73] Assignees: Automobiles Peugeot; Societe Anonyme Automobiles Citroen, both of Paris, France

[21] Appl. No.: 98,045

[22] Filed: Nov. 28, 1979

[30] Foreign Application Priority Data

Dec. 7, 1978 [FR] France .............................. 78 34493
Aug. 3, 1979 [FR] France .............................. 79 19942

[51] Int. Cl.³ .............................................. F16F 9/10
[52] U.S. Cl. ............................... 267/8 R; 248/562; 267/63 R; 267/140.1; 267/141; 267/153
[58] Field of Search ................ 267/8 R, 140.1, 140.3, 267/141.1, 141, 35, 63 R, 152, 153; 248/562; 280/712

[56] References Cited

U.S. PATENT DOCUMENTS

| | | | |
|---|---|---|---|
| 2,535,080 | 12/1950 | Lee .................................... | 267/140.1 |
| 2,553,635 | 5/1951 | Dath .................................. | 267/63 R |
| 2,958,526 | 11/1960 | Ulderup et al. .................... | 267/63 R |
| 3,416,783 | 12/1968 | Tondato ............................ | 267/152 X |
| 3,881,767 | 5/1975 | Klees ................................ | 267/63 R X |

FOREIGN PATENT DOCUMENTS

| | | | |
|---|---|---|---|
| 753266 | 10/1964 | Fed. Rep. of Germany ........ | 267/140.3 |
| 2659844 | 11/1977 | Fed. Rep. of Germany ........ | 267/35 |
| 1139533 | 1/1969 | United Kingdom .................... | 248/562 |

*Primary Examiner*—George E. A. Halvosa
*Attorney, Agent, or Firm*—Burns, Doane, Swecker & Mathis

[57] ABSTRACT

An elastically yieldable block structure comprising a block of elastomer interconnecting two armatures and defining at least two cavities which are filled with liquid and communicate with each other. One cavity is a main center cavity which is provided in the block and has walls which have a high resistance to the inner pressure of the liquid and the other cavity is a lateral cavity which communicates with the center cavity. At least a part of the lateral walls of the lateral cavity or cavities has a low resistance to the inner pressure of the liquid.

15 Claims, 11 Drawing Figures

ELASTICALLY YIELDABLE BLOCK STRUCTURE, IN PARTICULAR FOR THE SUSPENSION OF AN ENGINE OF A VEHICLE

DESCRIPTION

The present invention relates to an elastically yieldable block structure for the suspension of vibrating parts and more particularly internal combustion engines in automobile vehicles.

Elastically yieldable block structures of elastomeric material comprising two inner cavities filled with liquid and separated by a damping orifice have already been proposed. They have the drawback of transmitting to the body of the vehicle the high frequency vibrations from the engine, since the damping orifice must be calculated for damping low frequency vibrations of the engine (5 to 15 Hz) corresponding to the natural frequency of the suspended mass, so that the damping force becomes high at higher frequencies (30 to 200 Hz) corresponding to the vibrations from the inevitable imperfections in the balancing of the engine.

This drawback is overcome by separating the two cavities by a partition wall which is movable a predetermined distance inside a recess in respect of which the liquid passage sections located on each side of the partition wall are large enough to avoid hindering the movement of the liquid between the two cavities. In this case, the vibrations of small amplitude are well filtered and, moreover, the forces driving the liquid and the movable partition wall reduce the stiffness for frequencies lower than the frequency of resonance of the masses of liquid driven by the stiffnesses of the resistance of the walls of the cavities to pressure.

An object of the invention is to provide an elastically yieldable block structure whereby it is possible to obtain the same result but with a particularly simple and cheap design.

According to the invention, there is provided an elastically yieldable block structure comprising a block of an elastomer which interconnects two armatures and defines at least two cavities filled with liquid and communicating with each other, the block structure comprising a main centre cavity whose walls have a high resistance to the inner pressure of the liquid and at least one lateral cavity which communicates with the centre cavity and in respect of which at least a part of its lateral wall has a low resistance to the inner pressure of the liquid, said cavities and their passageways of communication opening onto the same face of the block of elastomer and having surfaces which have a draft so as to permit an easy withdrawal from a single mould, said cavities and their connecting passageways being defined by a single closing plate.

An embodiment of the invention will be described hereinafter with reference to the accompanying drawing in which.

Figure 1:
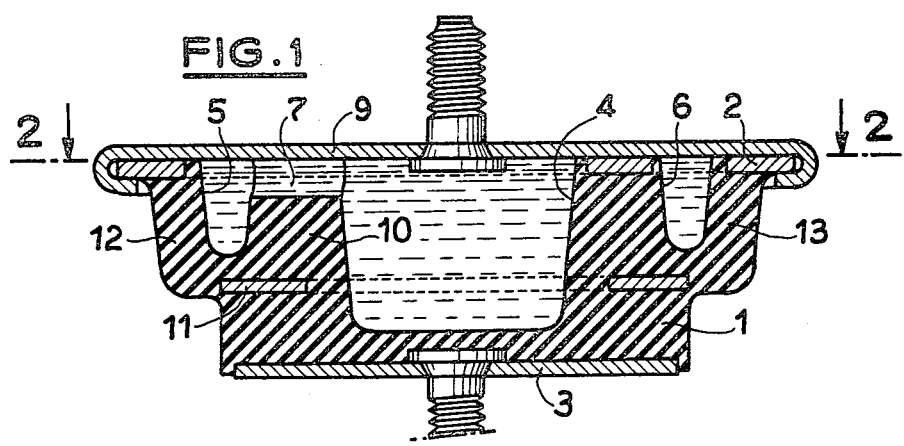
FIG. 1 is a cross-sectional view of a block structure taken on line 1—1 of FIG. 2.

The block structure shown in the drawing comprises a block 1 of an elastomer disposed between two parallel armatures 2, 3 to which it is bonded or vulcanized.

Formed in the block 1 are a centre cavity 4, two lateral cavities 5, 6 and grooves or passageways 7, 8 putting each lateral cavity in communication with the centre cavity. The cavities and the passageways open onto one of the faces of the block 1, namely the upper face thereof in FIG. 1, through openings in the armature 2 and their inner surfaces have a draft so that they may be produced by an easily withdrawable single mould.

All the cavities and passageways are filled with a liquid, for example water to which anti-freeze had been added, and are closed in a sealed manner by a plate 9 which is in contact with portions of the block 1 which delimit the cavities 5, 6 and passageways 7, 8 in said upper face of the block and is formed-over onto the armature 2 throughout its periphery.

The walls 10 of the centre cavity 4 are thick and have a high resistance to the inner pressure exerted by the liquid. This resistance is greatly increased by an intermediate armature 11 embedded in the block 1.

The lateral cavities 5, 6 are defined on the outside by thinner walls 12, 13 which have a low resistance to the pressure exerted by the liquid. Moreover, these walls 12, 13 are solely located in the region of the armature 2 over which the closing plate 9 is formed, but they are located outside the periphery of the armatures 3 and 11. The walls 12, 13 are consequently not compressed between two armatures so that the bending thereof is facilitated.

In a block structure designed in this way, when there is a relative movement between the two armatures 2 and 3 in a direction perpendicular to their mean planes, a certain amount of liquid is transferred by way of the passageways 7 and 8 from the centre cavity 4 to the lateral cavities 5, 6 if the armatures 2, 3 move toward each other and, inversely, if the armatures move away from each other.

The forces required to put the liquid in movement in the passageways 7 and 8 increase as the square of the frequency, for a constant amplitude of the armatures and so long as the frequencies remain sufficiently below the frequency of resonance of the driven masses of liquid.

Figure 3:
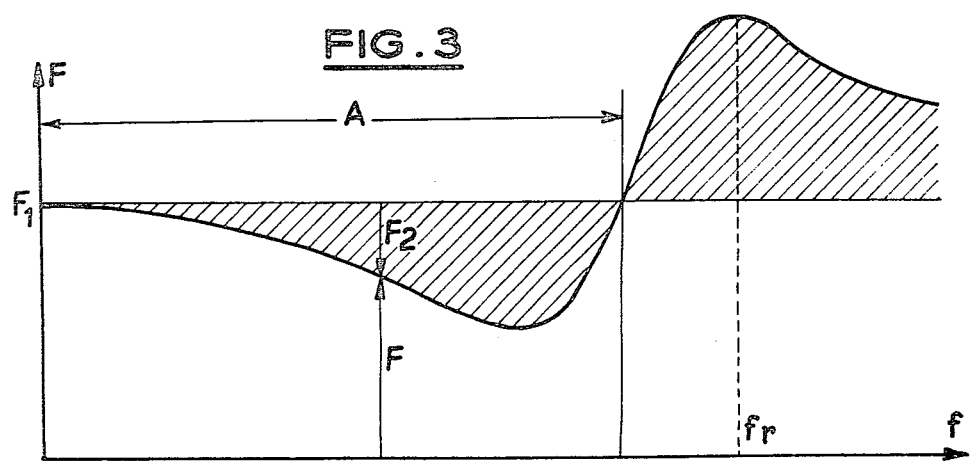
FIG. 3 is a diagram showing the force transmitted by the block structure to the support on which it is fixed, as a function of the frequency.

There is shown in the diagram of FIG. 3 the variation in the force F transmitted to the support on which the block structure is fixed, as a function of the frequency f. This force F is equal to the algebraic sum of the force $F_1$, due to the natural stiffness of the block of elastomer without liquid, and the force $F_2$ required to put the liquid in movement.

The force $F_1$ is expressed by the relation: $F_1 = kx$ in which k is the natural stiffness of the elastomer and x the amplitude of the movement between the armatures. This is the force which would be transmitted to the support if the block structure did not include liquid. As a function of the frequency, this force is constant.

The force $F_2$ is expressed by the following relations, so long as the frequencies remain sufficiently below the frequency of resonance fr of the driven masses of liquid:

$$F_2 = m\gamma$$

in which $F_2 = m\omega^2 a^2 x$
if it concerns a sinusoidal movement in which m is the mass of liquid driven in the passageways, $\gamma$ is the acceleration of the liquid in the passageways, $\omega$ represents the pulsation and is equal to $2\pi f$, a is a coefficient which represents the ratio between the amplitude of the movement of the liquid and the amplitude of the movement between the armatures.

This force $F_2$ opposes the force $F_1$ so that the force F transmitted to the support has the shape of the curve shown in FIG. 3.

As compared with a simple block of elastomer, there is therefore obtained an elastically yieldable block structure which has an improved filtering of the high frequency vibrations, for a stiffness which is substantially identical at low frequency.

The practical zone of utilisation of the block structure is indicated at A in FIG. 3.

It will be understood that the best results are obtained when the lower part of the curve F is located in the zone of the most frequent running speeds of the suspended engine.

The overall apparent stiffness K of the block structure just described is expressed by the relation:

$$K = (F_1 + F_2)/x$$

in which $K = k - m\, a^2\omega^2$.

It is easy to obtain, by means of a suitable dimensioning of the cavities and passageways, a minimum overall stiffness of the order of one half of the stiffness which would be given by a simple block of elastomer.

It can be seen that this interesting result is obtained with a very cheap support which is particularly easy to produce.

In the described embodiment, it has been assumed that the support comprises two lateral cavities 5, 6 which are disposed symmetrically. It will be understood that this number is quite arbitrary and it is even possible to provide an annular lateral cavity extending around the centre cavity.

Figure 2:
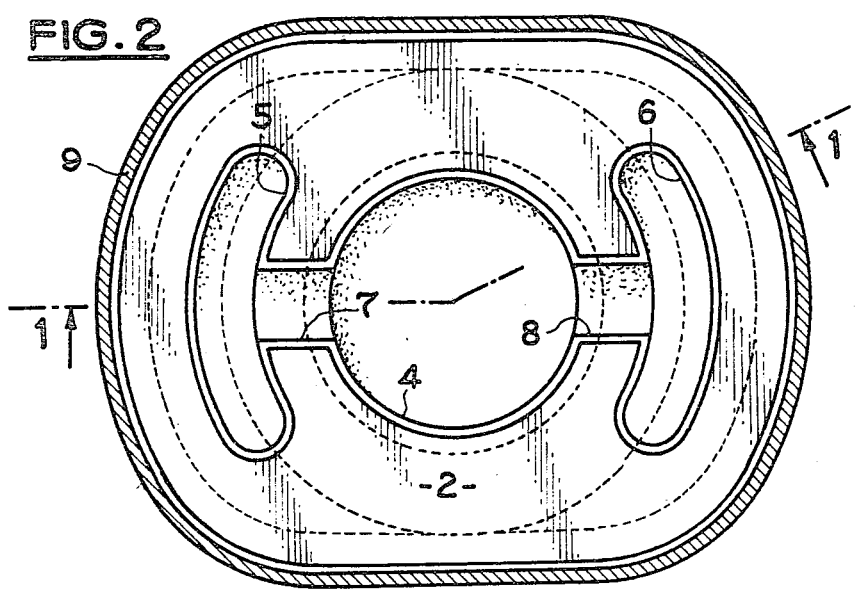
FIG. 2 is a cross-sectional view taken on line 2—2 of FIG. 1.

The block structure described with reference to FIGS. 1 to 3 is designed to be effective at frequencies lower than the frequency at which the mass of liquid in movement in the connecting passageways reaches resonance and there is employed therein the force required to put the liquid in movement so as to reduce the force coming from the natural stiffness of the block of elastomer. In this way there is obtained a block structure which offers a very good filtering of high frequency vibrations for a greater stiffness at low frequency.

The block structures described in the other embodiments have practically the same qualities but also provide a much more definite damping in the frequency range corresponding to the frequency of resonance of the engine in suspension. The intention here is to very distinctly improve the comfort by reducing the trembling of the engine relative to the body.

This result is obtained by giving to the or each connecting passageway between the centre cavity and the or each lateral cavity a length which is sufficient to ensure that the frequency of resonance of the mass of liquid in movement in the or each passageway substantially coincides with the frequency of resonance of the engine on its suspension.

Figure 4:
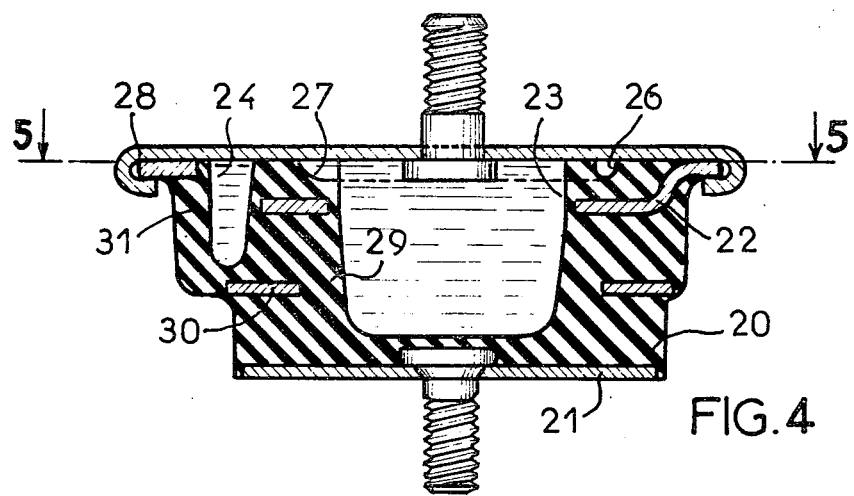
FIG. 4 is an axial sectional view taken on line 4—4 of FIG. 5 of another embodiment of the block structure according to the invention.
Figure 5:
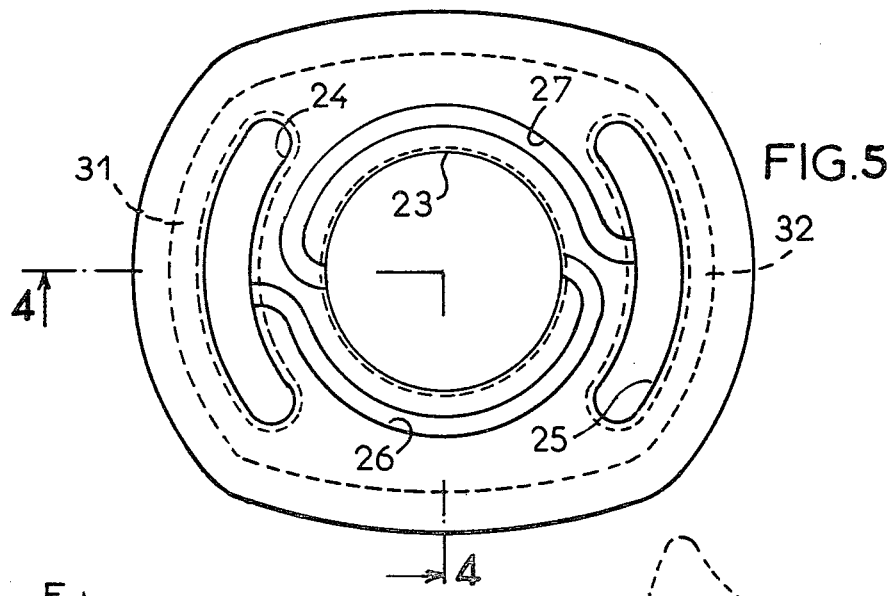
FIG. 5 is a sectional view taken on line 5—5 of FIG. 4.

The elastically yieldable block structure shown in FIGS. 4 and 5 comprises a block of elastomer 20 bonded or vulcanized to the armatures 21 and 22.

Formed in the block 20 are a centre cavity 23, two lateral cavities 24, 25 and connecting grooves or passageways 26, 27 between each lateral cavity and the centre cavity. The cavities and the connecting passageways open onto one of the faces of the block 20, namely the upper face thereof in FIG. 4, and their inner surfaces have a draft so that it can be produced by an easily withdrawable single mould.

The armature 22 has openings in the region of the cavities 23, 24 and 25 and a dished portion so as to avoid additional openings in the region of the connecting passageways 26, 27. The shape of the latter is shown in FIG. 2. Each passageway connects a point of the centre cavity 23 to the diametrally opposed lateral cavity 24, 25 by extending angularly about 180° about the centre cavity so that it has a relatively great length.

All the cavities and passageways are filled with a liquid, for example water to which anti-freeze has been added, and is clossed in a sealed manner by a plate 28 which is in contact with portions of the block which delimit the cavities 23, 24, 25 and the passageways 26, 27 in said upper face of the block and is formed over onto the armature 22 throughout its periphery.

The walls 29 of the centre cavity 23 are thick and have a high resistance to the inner pressure exerted by the liquid. This resistance is greatly increased by an intermediate armature 30 embedded in the block 20. The lateral cavities 24, 25 are defined on the outside by thinner walls 31, 32 having a low resistance to the pressure exerted by the liquid. Further, these walls 31, 32 are only located in the region of the armature 22 onto which the closing plate 28 is formed over, but they are located outside the periphery of the armatures 22 and 30. The walls 31, 32 are consequently not compressed between two armatures so that the bending thereof is facilitated and it is ensured that the lateral cavities do not hinder the movement imposed on the liquid by the centre cavity.

As in the case of the block structure described with reference to FIGS. 1 and 2, the relative movement between the armatures 21 and 22 in a direction perpendicular to their mean planes results in a transfer of liquid between the centre cavity 23 and the lateral cavities 24, 25. However, the lengthening of the passageways 26, 27 has for effect to lower the frequency of resonance of the driven mass of liquid driven by the stiffness of the centre cavity with respect to pressure. Knowing (everything else being equal) that this frequency of resonance is proportional to the square root of the cross-section of the passageways and inversely proportional to the square root of their length, it is possible to dimension these passageways in such a way that the frequency of resonance of the mass of liquid substantially corresponds to the frequency of resonance of the engine on its suspension.

Figure 6:
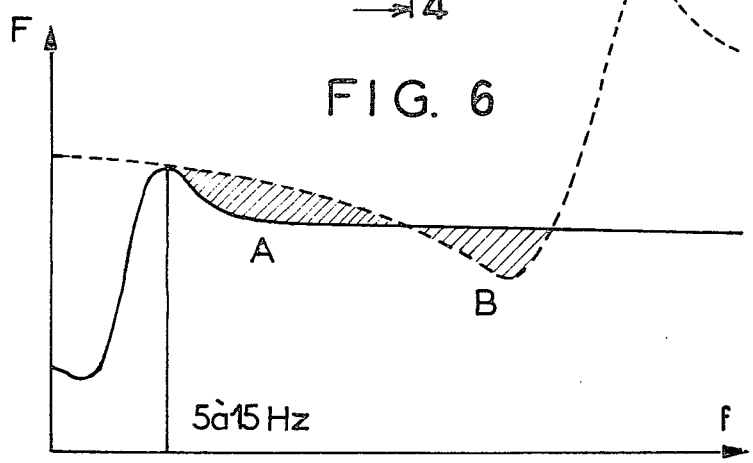
FIG. 6 is a diagram showing the force transmitted by the block structure to the support on which it is fixed, as a function of the frequency.

Indeed, the diagram of FIG. 6 shows, in full line, the shape of the curve representing the force transmitted by the block structure to the support on which it is fixed, as a function of the frequency for a constant amplitude at the armatures.

This curve has a point for the frequency of resonance of the mass of liquid in movement in the connecting passageways, and owing to the lengthening of the latter, this frequency substantially coincides with the frequency of resonance of the engine on its suspension, which is usually of the order of 5 to 15 Hz.

There has also been shown in the diagram of FIG. 6, in dotted line, the shape of the same curve with the block structure in accordance with the previously-described embodiment.

Thus it is clear that it is possible to give to the block structure substantially the same overall stiffness for the frequency of resonance of the engine on its suspension. This result is obtained by reducing the stiffness of the elastically yieldable body considered alone. The filtering qualities obtained in either case are then substantially equivalent, that is to say better in the zone A and a little less so in the zone B.

On the other hand, the fact of putting the liquid in resonance results in multiplying by three to seven the value of the damping achieved for the frequency of resonance of the engine on its suspension, which considerably reduces the trembling of the engine at this frequency and consequently very definitely improves the comfort.

Figure 7:
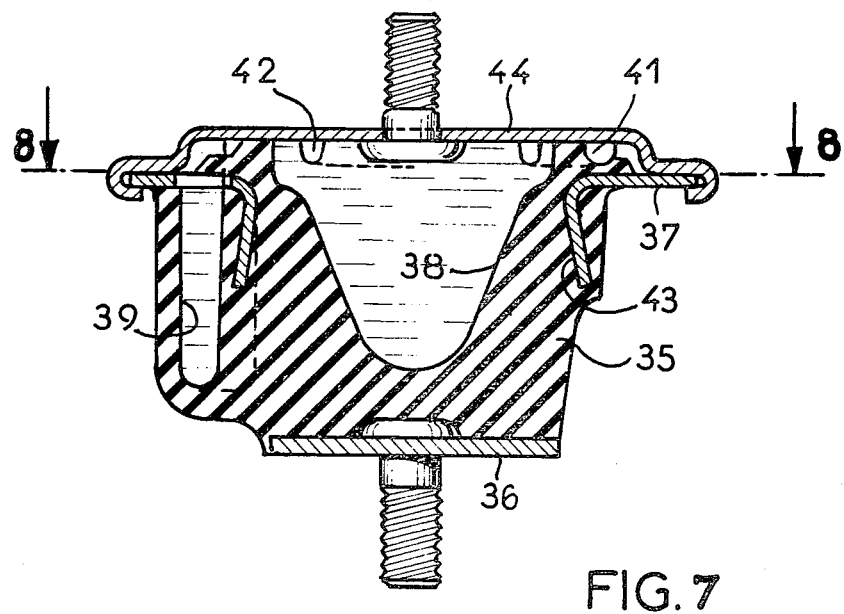
FIG. 7 is a sectional view taken on line 7—7 of FIG. 8 and similar to that of FIG. 4 in respect to another embodiment.
Figure 8:
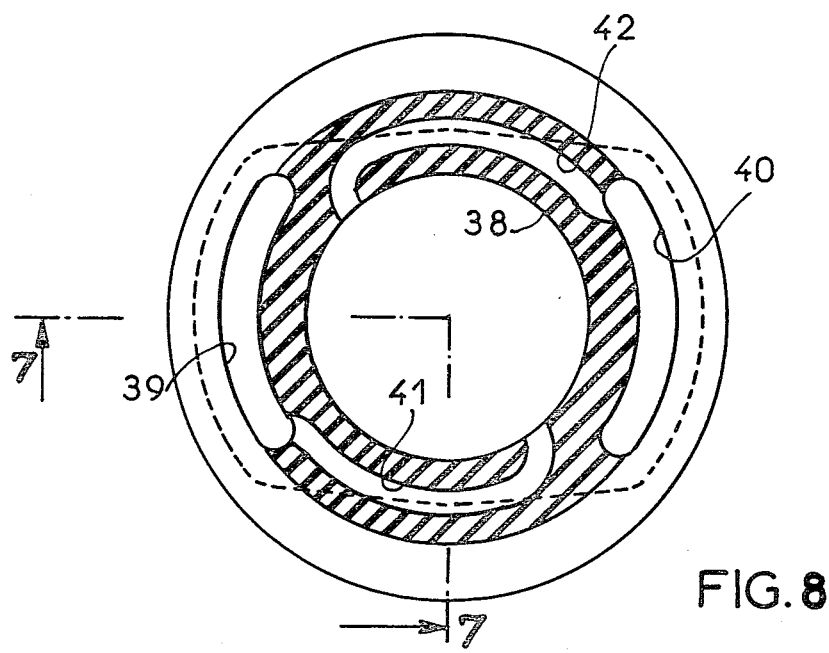
FIG. 8 is a sectional view taken on line 8—8 of FIG. 7.

The elastically yieldable block structure shown in FIGS. 7 and 8 comprises a block 35 of elastomer bonded or vulcanized to two armatures 36,37.

As in the first embodiment, there are formed in the block a centre cavity 38, two lateral cavities 38, 40 and connecting grooves or passageways 41, 42.

In this third embodiment, the centre cavity 38 has a highly part-conical inner wall and the armature 37 has a dished portion 43 which is also part-conical. This arrangement softens the elastically yieldable body in the axial direction.

The passageways 41, 42 are formed in a thickened portion of the block 35 outside the planar part of the armature 37 and the cover 44 has a dished portion so as to adjoin the plane of closure with the armature 37. The shape of these passageways is also slightly different, since they surround the centre cavity to an angular extent of only about 90° to 110°.

Figure 9:
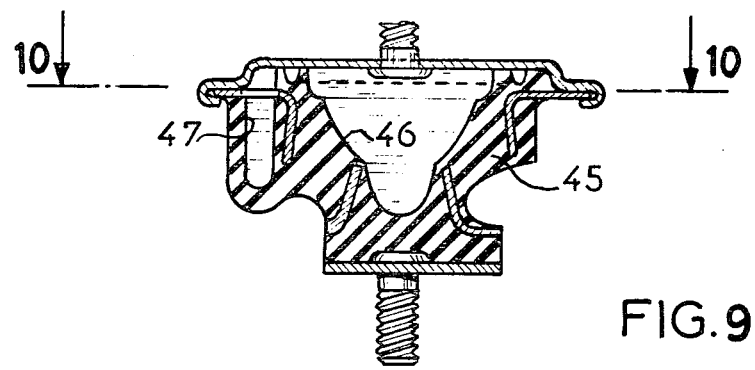
FIG. 9 is a sectional view take on line 9—9 of FIG. 10 and similar to that of FIG. 4 in respect of another embodiment.
Figure 10:
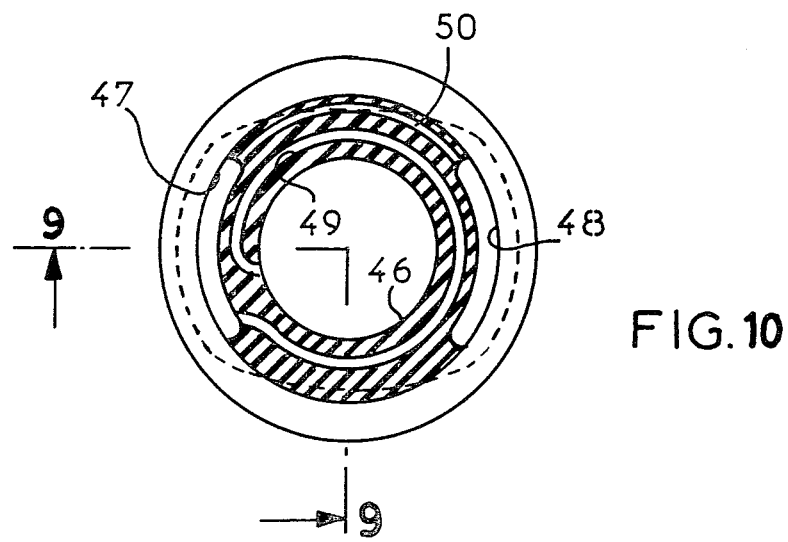
FIG. 10 is a sectional view taken on line 10—10 of FIG. 9.

As the foregoing embodiments, the elastically yieldable block structure shown in FIGS. 9 and 10 comprises a block of elastomer 45 in which are formed a centre cavity 46 and two lateral cavities 47, 48.

In this embodiment, the centre cavity 46 is connected to the lateral cavity 47 by a connecting groove or passageway 49 in the block which extends substantially completely around the centre cavity 46. This arrangement consequently gives an increased length to this connecting passageway. In this case, the function of the second lateral cavity 48 is to absorb the volume of liquid displaced when the block structure is put under static load, and, for this purpose, the two lateral cavities 47, 48 are interconnected by a balancing passageway 50 whose section is not critical.

Figure 11:
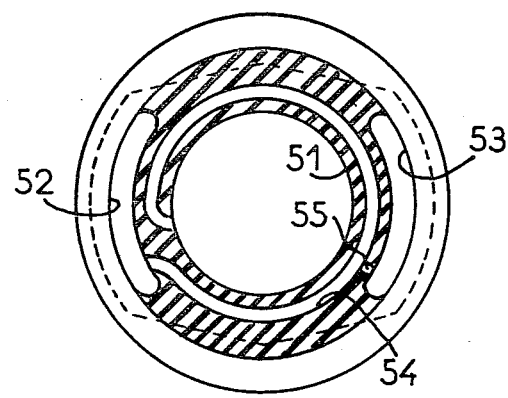
FIG. 11 is a sectional view similar to that of FIG. 10 in respect to another embodiment.

The block structure shown in FIG. 11 comprises a centre cavity 51, two lateral cavities 52, 53 and a connecting groove or passageway 54 between the cavities 51, 52 which are in every way identical to those of the preceding embodiment. In this case, the balancing of the static pressures between the lateral cavities 52, 53 is ensured by a balancing groove or passageway 55 which connects the passageway 54 to the cavity 53. This passageway 55 must then have a section which is distinctly less than that of the passageway 54, that is to say the section of the passageway 54 must be at least four times that of the passageway 55.

Having now described our invention what we claim as new and desire to secure by Letters Patent is:

1. An elastically yieldable block structure comprising a moulded block of elastomer having a first face and a second face opposed to the first face, a first armature connected to the block adjacent said first face and a second armature connected to the block adjacent said second face, at least two cavities in the block each of which cavities extends from said first face toward said second face, a liquid filling the cavities, the cavities comprising a main centre cavity which is laterally defined by walls which are part of the block and have a high resistance to the inner pressure of the liquid and has a closed end between said first and second faces and at least one lateral cavity, at least one groove in said first face of the block and putting the lateral cavity in communication with the centre cavity, the lateral cavity being defined laterally by lateral walls which are part of the block and have at least a portion which has a low resistance to the inner pressure of the liquid which is lower than said high resistance, the lateral cavity having a closed end remote from said first face, said cavities and the groove having surfaces having a draft throughout their extent from said first face so as to permit an easy withdrawal of a single mould from said first face of the block, a single closing plate in contact with portions of the block delimiting in said first face the centre cavity, the lateral cavity and the groove and thereby closing the cavities off from each other except in the region of the groove, and means fixing said plate against said first face of the block.

2. A block structure as claimed in claim 1, wherein said closing plate is fixed on its periphery by a portion thereof which is formed over onto said first armature.

3. A block structure as claimed in claim 1, wherein the resistance to pressure of the walls of the centre cavity is reinforced by an intermediate armature which is embedded in the block of elastomer.

4. A block structure as claimed in claim 1 or 4, wherein the part of the lateral walls of the lateral cavity having a low resistance to inner pressure of the liquid is located solely adjacent to said first armature to which the closing plate is fixed by a formed over portion thereof and is located outside the periphery of the other armatures of the block structure.

5. An elastically yieldable block structure as claimed in any one of the claims 1 to 3, wherein the centre cavity has a substantially cylindrical shape.

6. An elastically yieldable block structure as claimed in any one of the claims 1 to 3, wherein the centre cavity has a substantially frustoconical shape.

7. An elastically yieldable block structure comprising a moulded block of elastomer having a first face and a second face opposed to the first face, a first armature connected to the block adjacent said first face and a second armature connected to the block adjacent said second face, cavities in the block each of which cavities extends from said first face toward said second face, a liquid filling the cavities, the cavities comprising a main centre cavity which is laterally defined by walls which are part of the block and have a high resistance to the inner pressure of the liquid and has a closed end between said first and second faces and at least two lateral cavities, at least two grooves in said first face of the block and respectively putting the two lateral cavities in communication with the centre cavity, the lateral cavities being defined laterally by lateral walls of the block which have at least a part which has a low resistance to the inner pressure of the liquid which is lower than said high resistance, the lateral cavities having a closed end remote from said first face, said cavities and the groove having surfaces having a draft throughout their extent from said first face so as to permit an easy withdrawal of a single mould from said first face of the block, a single closing plate in contact with portions of the block delimiting in said first face the centre cavities, the lateral cavities and the grooves and thereby closing the cavities off from each other except in the region of the grooves, and means fixing said plate against said first face of the block.

8. An elastically yieldable block structure for combination with and interposition between an engine and a support for the engine, the block structure comprising a moulded block of elastomer having a first face and a second face opposed to said first face, a first armature connected to the block adjacent said first face and a second armature connected to the block adjacent said second face, a liquid filling the cavities, the cavities comprising a main centre cavity which is laterally defined by walls which are part of the block and have a high resistance to the inner pressure of the liquid and has a closed end between said first and second faces and at least one lateral cavity, at least one groove in said first face of the block and putting the lateral cavity in communication with the centre cavity, the lateral cavity being defined laterally by lateral walls which are part of the block and have at least a part which has a low resistance to the inner pressure of the liquid which is lower than said high resistance, the lateral cavity having a closed end remote from said first face, said cavities and the groove having surfaces having a draft throughout their extent from said first face so as to permit an easy withdrawal of a single mould from said first face of the block, a single closing plate in contact with portions of the block delimiting in said first face the centre cavity, the lateral cavity and the groove and thereby closing the cavities off from each other except in the region of the groove, and means fixing said plate against said first face of the block, the groove having a length which is such that the frequency of resonance of the mass of liquid in movement in the groove substantially coincides with the frequency of resonance of the engine on said support.

9. An elastically yieldable block structure as claimed in claim 8, wherein the groove partly surrounds the centre cavity.

10. An elastically yieldable block structure as claimed in claim 9, comprising at least two of said lateral cavity disposed substantially symmetrically relative to the centre cavity, a groove associated with a respective one of the lateral cavities surrounding the centre cavity to an angular extent of substantially 90° to 180°.

11. An elastically yieldable block structure as claimed in claim 9, comprising at least two of said lateral cavity disposed substantially symmetrically relative to the centre cavity, only one of the lateral cavities being connected to the centre cavity by the groove.

12. An elastically yieldable block structure as claimed in claim 11, wherein said groove surrounds the centre cavity to an angular extent of substantially 270° to 360°.

13. An elastically yieldable block structure as claimed in claim 11 or 12, further comprising a second groove interconnecting the lateral cavities.

14. An elastically yieldable block structure as claimed in claim 11 or 12, further comprising a second groove which connects the first-mentioned groove to the lateral cavity which is not connected to the centre cavity by the first-mentioned groove.

15. An elastically yieldable block structure as claimed in claim 14, wherein the second groove has a sectional size which is at the most substantially one quarter of the sectional size of the first-mentioned groove.

* * * * *